United States Patent [19]
Currie

[11] Patent Number: 5,974,645
[45] Date of Patent: Nov. 2, 1999

[54] PORTABLE GOLF CLUB CUSTOMIZING SYSTEM

[75] Inventor: Kirk Currie, Spring, Tex.

[73] Assignee: Kurr Golf Technology, Conroe, Tex.

[21] Appl. No.: 08/789,164

[22] Filed: Jan. 24, 1997

[51] Int. Cl.⁶ .............................. B23P 23/00; B23P 17/00
[52] U.S. Cl. .......................... 29/407.05; 29/720; 29/721; 29/33 R; 72/31.05; 72/293
[58] Field of Search ................... 29/407.05, 720, 29/721, 33 R; 72/31, 32, 293, 306, 316, 31.04, 31.05; 33/508

[56] References Cited

U.S. PATENT DOCUMENTS

| | | |
|---|---|---|
| 2,973,581 | 3/1961 | Rhodehhamel . |
| 3,439,429 | 4/1969 | Sundstrom . |
| 4,094,072 | 6/1978 | Erb ......................................... 72/293 X |
| 4,245,391 | 1/1981 | Heller .................................... 72/293 X |
| 4,245,392 | 1/1981 | Heller .................................... 72/293 X |
| 4,622,836 | 11/1986 | Long et al. ........................... 72/293 X |
| 4,640,017 | 2/1987 | Cukon ......................................... 33/508 |
| 5,327,766 | 7/1994 | Humphreys et al. ................. 33/508 X |
| 5,421,098 | 6/1995 | Muldoon ................................... 33/508 |

FOREIGN PATENT DOCUMENTS 407989   3/1934   United Kingdom ..................... 33/508

*Primary Examiner*—S. Thomas Hughes
*Attorney, Agent, or Firm*—Jenkens & Gilchrist, P.C.

[57] ABSTRACT

A system for customizing a golf club which utilizes a hosel to interconnect the had and the shaft includes a hosel bending vise. The hosel bending vise imparts an offset bend and a lie angle bend in the hosel. The shaft of the golf club is then cut to length. If desired a loft angle bend may be made in the hosel.

24 Claims, 16 Drawing Sheets

FIG. 10

LIE ANGLE GUIDE SETTINGS — 700

| MODEL | UPRIGHT | | | | | | 72° | | | | FLAT | | | |
|---|---|---|---|---|---|---|---|---|---|---|---|---|---|---|
| | 6° | 5° | 4° | 3° | 2° | 1° | 0 | 1° | 2° | 3° | 4° | 5° | 6° |
| SHORT HOSEL | 4.5 | 4.0 | 4.0 | 4.0 | 3.5 | 3.5 | 3.5 | 3.5 | 3.5 | 3.0 | 3.0 | 3.0 | 2.5 |
| LONG HOSEL PERIMETER | 8.5 | 8.0 | 7.5 | 7.0 | 6.5 | 6.0 | 5.5 | 5.0 | 4.5 | 4.0 | 3.5 | 3.0 | 2.5 |
| MALLET | N.A. | 9.0 | 8.5 | 8.0 | 7.5 | 7.0 | 6.5 | 6.0 | 5.5 | 5.0 | 4.5 | 4.0 | 3.5 |

NOTE:
1.) SUBTRACT "1" OR MORE RESULTS IN THE PUTTER BEING TOE HEAVY.
2.) ADD "1" OR MORE RESULTS IN THE PUTTER BEING HEEL HEAVY.

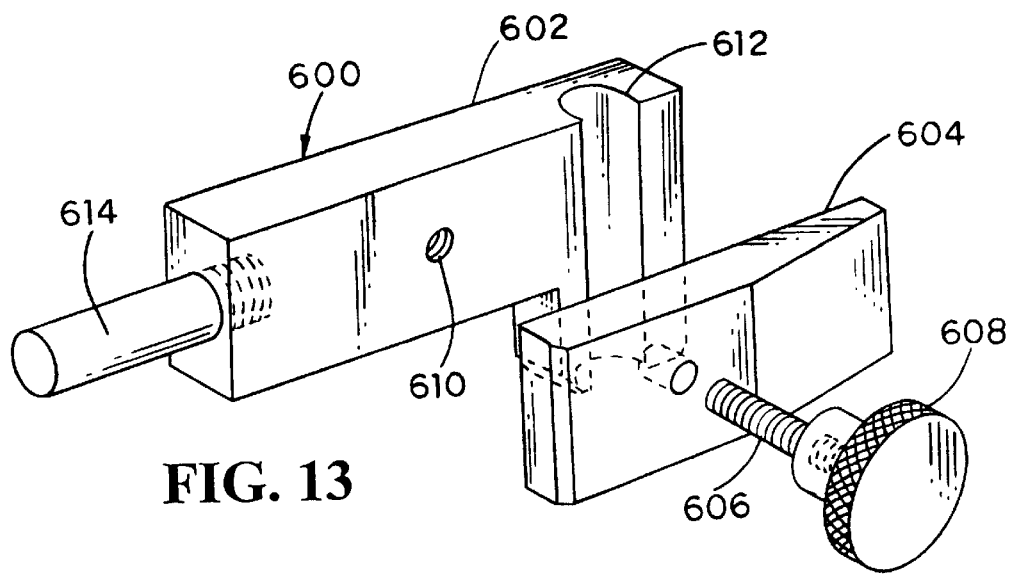
FIG. 13
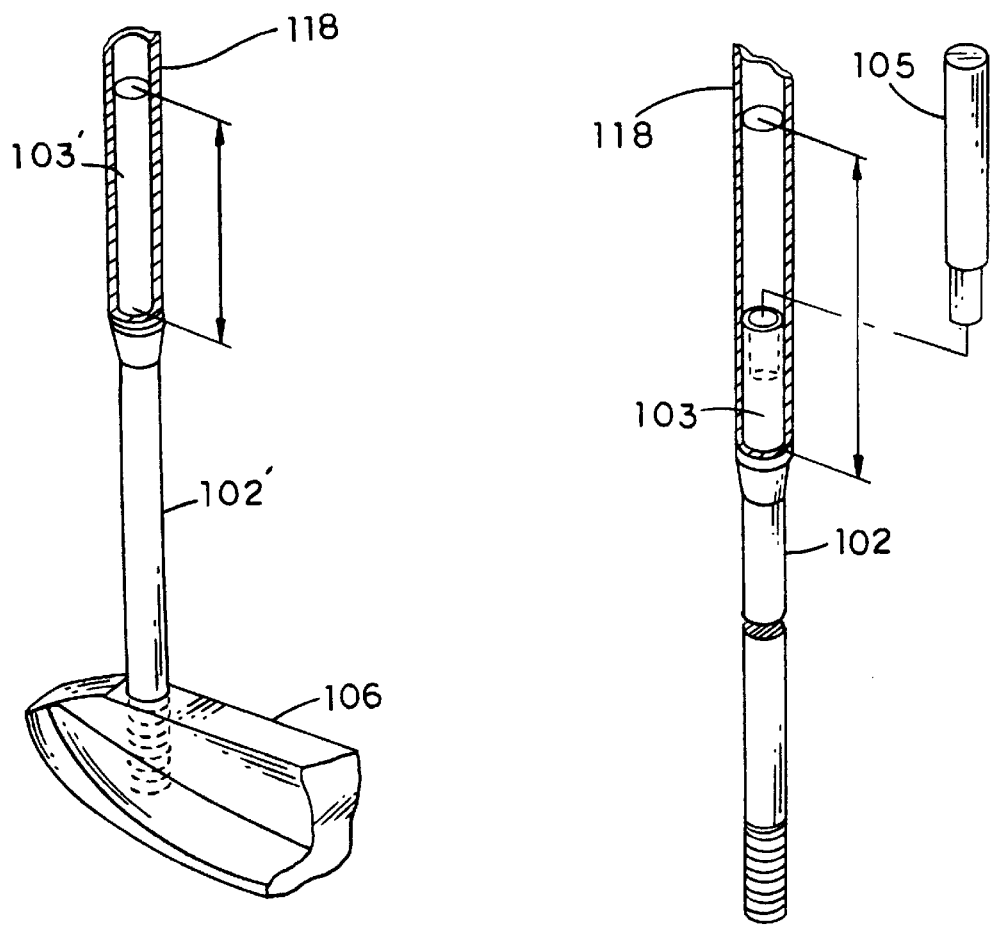
FIG. 14 A   FIG. 14 B

PORTABLE GOLF CLUB CUSTOMIZING SYSTEM

FIELD OF THE INVENTION

The present invention pertains to the manufacture of golf clubs; more particularly the present invention pertains to customizing a golf club to individual golfers.

BACKGROUND OF THE INVENTION

Many golf professionals believe that individual golfers can dramatically improve their golf game if their golf clubs are customized to fit the size, structure, and strength of their bodies. Because each person's golf swing and physical capabilities are unique, customized golf clubs can maximize the performance in each golfer's unique swing and physical capabilities. Such maximization can be obtained, in part, by precisely adjusting the length of the golf club shaft and the spatial and geometric inter-relationship between the golf club head and the golf club shaft.

As many do not thoroughly understand the spatial and geometric inter-relationship between the golf club head and the golf club shaft, the next few paragraphs will lay the foundation for an understanding the Golf Club Customizing System of the present invention.

The Parts of a Golf Club

A still better understanding of the portable golf club customizing system of the present invention may be had by first understanding the parts included in a custom made golf club. Typically, a custom made golf club includes four parts.

Upper most is the grip. The grip is typically a rubber, or leather, cork plastic cover which fits over the end of the shaft. Most putter grips include a flat surface which golfers orient either perpendicular or parallel to the club head.

The shaft is the second major portion of the golf club. A golf club shaft is typically a hollow metal tube. It may also be solid. For example, solid shafts have been made from graphite. It is the shaft portion of the golf club which is primarily used to fit the golf club to the height of an individual golfer.

At the bottom of the club shaft is the hosel. The hosel connects the bottom of the club shaft to the club head. A particular design for a hosel is disclosed in U.S. Pat. No. 5,275,409 which is included herein by reference. The bottom of the shaft may either be received in the top of the hosel or the top of the hosel may be inserted into the hollow portion of the club shaft. Alternatively, an interconnecting insert piece may be inserted in the top of the hosel and also into the hollow portion of the club shaft.

At the lower end of the hosel is the club head. The club head normally includes a ball-striking face and a rear portion. For putters the club head design may be a blade, a perimeter or heel-toe weighted club head or a mallet style club head. For drivers, the club head design is typically of a mallet-style to get as much mass behind the golf ball striking face as possible. For irons, the club head design is typically a blade.

The Spatial and Geometric Relationship Between The Club Head and The Shaft

Having now described the basic components of a golf club, a still further understanding of the present invention may be had by describing the various spatial and geometric relationships which can be made in a golf club to suit the body size and the body structure of a particular golfer. The most basic spatial relationship is the length of the club shaft over the club head. Next comes the lie angle which defines the geometric relationship between the shaft and the club head.

Customization of a golf club is achieved by customizing the four basic components: the grip; the shaft; the hosel; and the club head. The present invention pertains specifically to the method of altering the hosel using a precise and measurable method.

Beyond the shaft length and the lie angle are several other more complex spatial and geometric relationships which can have a significant impact on the way in which a golfer strikes a golf ball. These complex inter-relationships will be explained in the paragraphs that follow.

The Offset Of the Ball Striking Face Of The Club Head From The Long Axis Of The Club Shaft The first of the more complex spatial relationships is offset. Offset is the distance between the plane of the face of a golf club and an extension of the long axis of the club shaft. Specifically, in FIG. 2A, a golf club 100 having no offset is shown. Therein it will be seen that the front edge of the hosel 102 is effectively parallel with the striking face 104 of the golf club head 106.

A slight offset 112 is shown in FIG. 2B. Therein it may be seen that an extension of the long axis 110 of the golf club shaft 118 is slightly ahead of the striking face 104 of the club head 106. Further, in FIG. 2C, a even larger offset 114 is shown. The offset distance determines how the golfer aligns his visual picture of the golf ball 1000 with his stance and eventually his swing. For example, a large offset 114 is used by those golfers who like to see as much of the golf ball 1000 as possible as the club head 106 strikes the ball 1000. In addition to adjusting the visual picture of the club head 106 hitting the golf ball 1000, the size of the offset has a direct correlation to the size of the "sweet spot" on the striking face 104 of the golf club head 106. The "sweet spot" is the center of gravity of a club in the toe heel direction. As the hosel 102 offset distance increases, so does the size of the sweet spot. Thus, the larger size of the sweet spot, the more stable the golf club is when the contact point between the club head 100 and the golf ball 1000 is away from the center of the sweet spot.

The Lie Angle Bend

In FIGS. 3A and 3B, the effect of the lie angle bend is shown. Specifically, in FIG. 3A, a golf club head 106 is shown wherein the lie angle bend needs to be decreased or flattened in order that the bottom surface 116 or more specifically the toe 118 of the club head 106 is closer to the ground. In FIG. 3B is shown the opposite condition where the lie angle bend must be increased in order for the heel 120 of the golf club head 106 to be closer to the ground. While the standard lie angle bend is approximately 72°, the proper lie angle bend for an individual golfer depends both on the distance that the golfer stands from the golf ball 1000, the golfer's body position, and the golfer's arm and hand position. This distance, body position and arm and hand position affects the golfer's visual picture of the intersection of the club head 106 with the golf ball 1000 just as the offset distance affects the golfer's visual picture of the intersection of the club head 106 and the golf ball 1000.

The Loft Angle

When the striking face 104 of a golf club head 106 hits a golf ball 1000 it should both lift the golf ball 1000 and impart translational force on the golf ball 1000 to move it closer to the hole. In the golf clubs known as irons the lift angle or loft varies greatly with the largest loft being in a club known as a wedge. The wedge is designed to impart the most upward force on the golf ball. In the golf clubs known as drivers the angle of the ball-striking face may also be varied to change the relationship between the horizontal and vertical forces imparted to the golf ball when struck by a moving club head. In putters, the ideal lift angle or loft is 2° to 4°. When a golf ball 1000 is struck by the striking face 104 of the club head 106 of a putter which is angled between 2° and 4° enough vertical force is imparted to the golf ball 1000 to lift it from the grass yet enough translational force is imparted to the golf ball 1000 to cause it to roll across the green toward the hole. This ideal condition is shown in FIG. 4A. Unfortunately, the geometric relationship between the club shaft 118 and the club head 106 or the posture of a golfer can have a dramatic effect on the lift angle or loft of on the face 104 of a golf club head 106. In FIG. 4B is shown a situation where either the geometric relationship between the golf club shaft 118 and the club head 106, the and position of the golfer, or a rear foot heavy stance of a golfer causes the loft to increase to 6° or more. In FIG. 4C the opposite condition is shown. By an improper geometric relationship between the club shaft 118 and the club head 106, the hand position of the golfer, or a front foot heavy stance of a golfer, the loft has been decreased to 0° or a negative angle.

Club Head Balance with Respect to the Club Shaft

If one were to place a finger at the point of balance on a club shaft 118 so that the weight of the club shaft 118 and grip on one side of the balance point were effectively equal to the weight of the club head 106 and shaft 118 on the other side of the balance point, the club head 106 would turn and seek its own balance orientation with respect to the long axis 110 the club shaft 118. For example, if the toe 118 of the club head 106 drops down, this is called toe-heavy balance. Similarly, if the heel 120 of the club head 106 drops down, this is called heel-heavy balance. If the face 104 of the club head 106 lies flat this is called face balance. The balance orientation of the club head 106 with respect to the long axis 110 of the club shaft 118 is particularly important for a golfer that has a decelerating swing. For example, if the golfer's swing decelerates the club head 106 will tend to follow its heaviest part. A toe heavy balanced club head 106 will tend to follow the toe of the club head 106 and thereby change the angle at which the ball-striking face 104 of the club head 106 hits the golf ball 1000.

Inter-relationships

Each one of the foregoing parameters in club design is inter-related to the other parameters. Thus, it is essential that any golf club customization system recognize these inter-relationships and account for them when placing bends in the hosel 102.

Existing Custom Golf Clubs

Unfortunately, in most commonly available golf clubs, it is extremely difficult to easily reposition the golf club head 106 with respect to the shaft 118. Thus the golfer must learn to change the position of his or her body to adapt to the golf club. Some golfers elect to have golf clubs specially made to suit their swing and style of play. However, when these specially made clubs are first provided to the golfer the need often arises to make special adjustments or "fine tune" the golf club to obtain maximum performance. Accordingly, the specially made golf club must be returned to the factory for adjustment or entirely remade. If the adjustments are incorrect or affect other parts of the complex inter-relationships of the spatial and geometric aspects of club design the custom golf club may once again have to be returned to the factory.

The Need In The Art

In U.S. Pat. No. 5,275,409, an improved hosel system is disclosed for use in golf clubs. This improved hosel system provided a system for making a custom golf clubs which allowed the angular relationship of the golf club head to the golf club shaft to be easily and accurately adjusted. While this hosel system dramatically improved the feel of the golf club in the golfer's hands when hitting a golf ball, it was also found that the hosel could be used to customize the spatial and geometric relationship of the club head with respect to the golf club shaft. The need remained, however, to provide a system for accurately customizing a golf club to an individual golfer which eliminated the requirement of first having to rely on a special factory to fabricate the specially made clubs, then second having to return the specially made golf clubs to the factory for additional adjustments to suit the needs of an individual golfer.

Summary of Invention

The portable golf club customizing system of the present invention provides an easy to use system which eliminates the need to rely on a special factory to manufacture and "fine tune" custom golf clubs.

Specifically, the portable system for accurately customizing a golf club to an individual golfer of the present invention includes a vise which both secures the head of the golf club and allows for bending the hosel which mounts the golf club shaft to the golf club head. The golf club is customized by first imparting an offset bend in the hosel. Second, a lie angle bend is formed in the hosel. If desired, a loft bend may also be placed in the hosel. Once the necessary bends have been made in the hosel the golf club shaft is cut to length and a grip is placed thereon. The golf club is now ready for use by a golfer. However, if desired, the golf club can be returned to the vise on the portable golf club customizing system and "fine tuning" adjustments can be made to assure that the golf club is exactly what the golfer needs to maximize the performance obtained from any particular club. All bending and adjustment operations can be done directly on site so the golfer can try out his custom golf club under actual playing conditions.

BRIEF DESCRIPTION OF THE FIGURES

A better understanding of the portable golf club customizing system of the present invention may be had by reference to the figures wherein:

FIG. 10 is chart of settings used for adjusting the balance of the ball striking face of the club head;

FIG. 13 is a perspective view of the operative end of the bending tool;

FIGS. 14A and 14B are perspective views in partial section, of the engagement of the hosel with the golf club shaft;

DESCRIPTION OF EMBODIMENTS

The System In General

Figure 1:
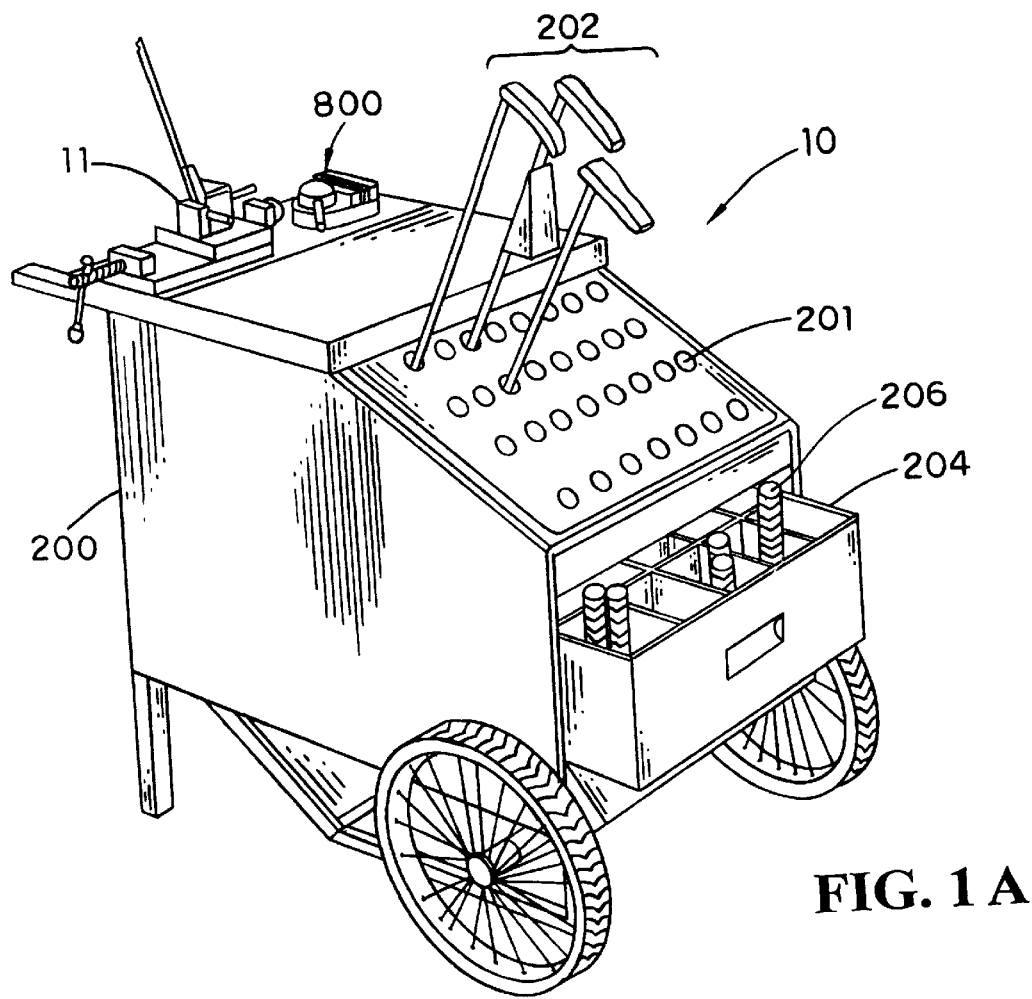
FIG. 1A is a front perspective view of the portable golf club customizing system of the present invention.
FIG. 1B is a rear perspective view of the portable golf club customizing system shown in FIG. 1.
Figure 1:
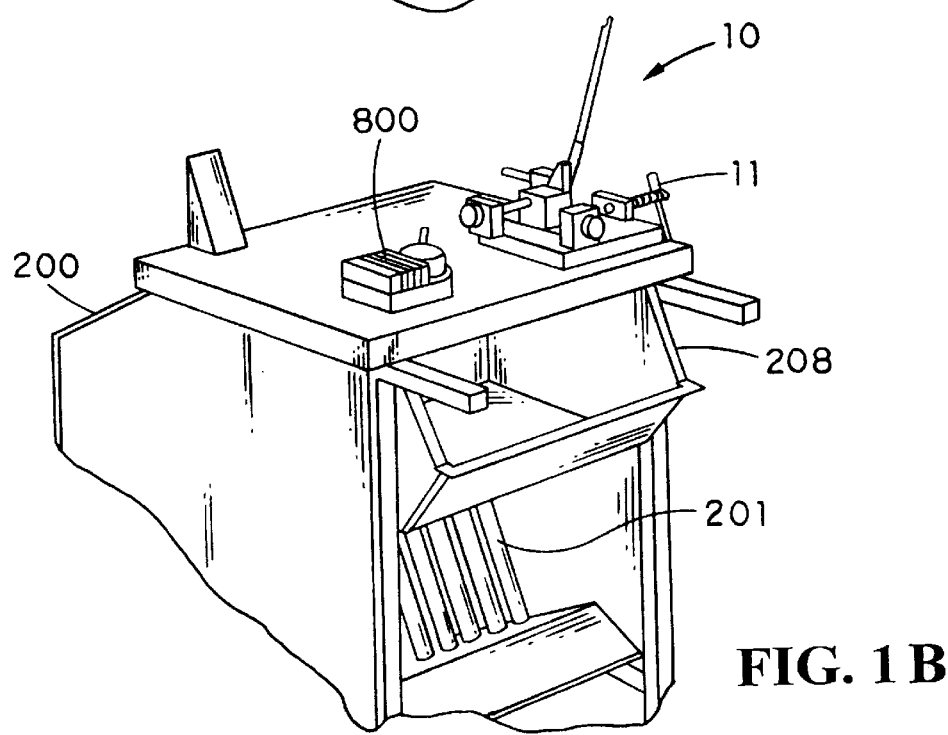
Figures 2A, 2B, 2C:
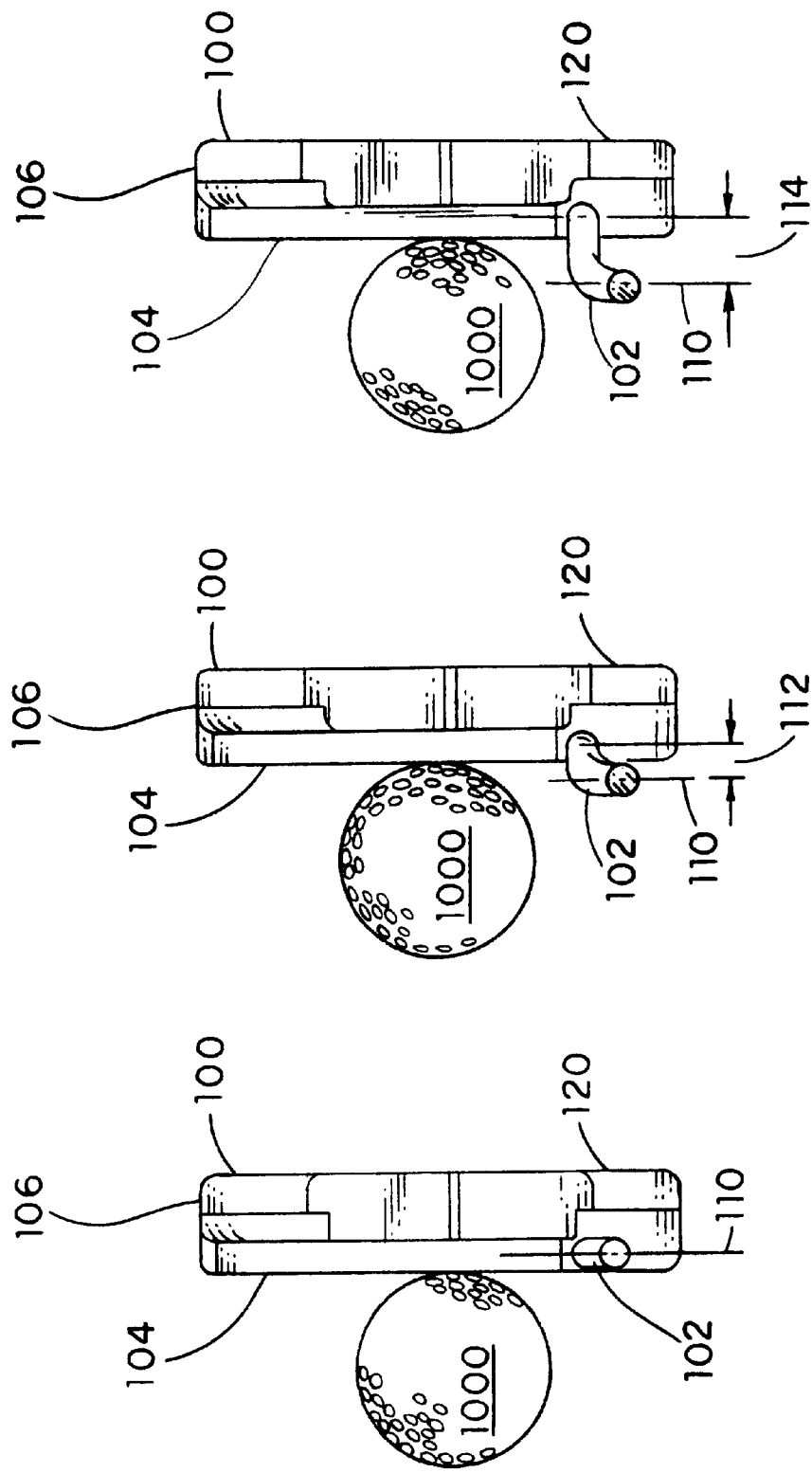
FIGS. 2A, 2B and 2C are top plan views of the various golf club head offsets with respect to the center line of a golf club shaft.
Figure 3:
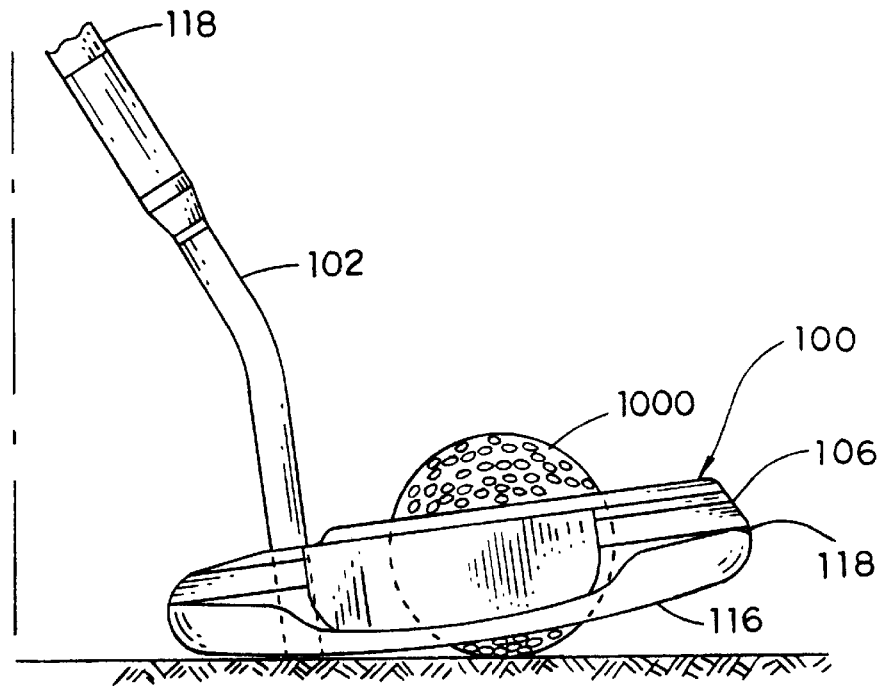
FIGS. 3A and 3B are rear elevational views of a golf club showing its relationship to the ground with an improper lie angle bend.
Figure 3:
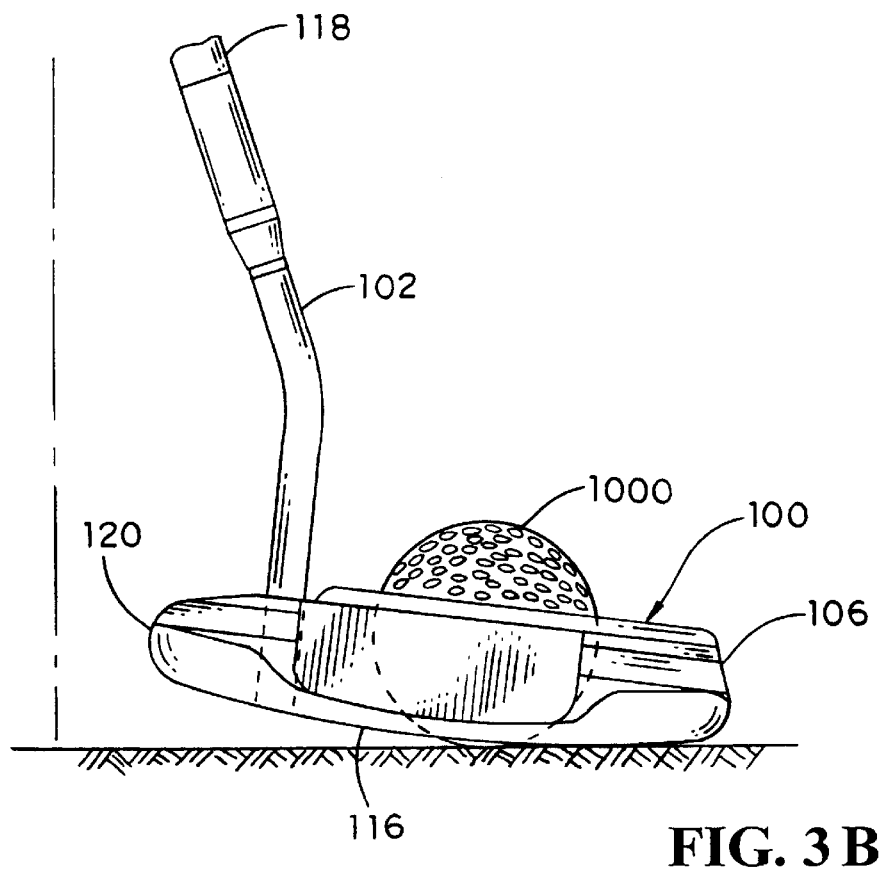
Figure 4C:
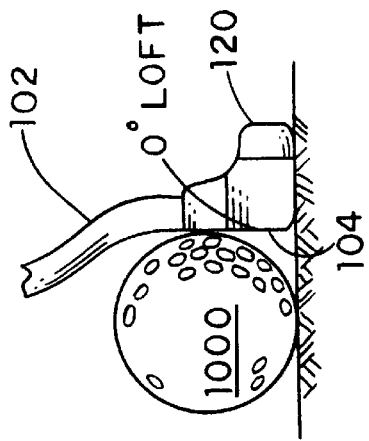
FIG. 4C is a side elevational view of a putter having too little loft.
Figure 4B:
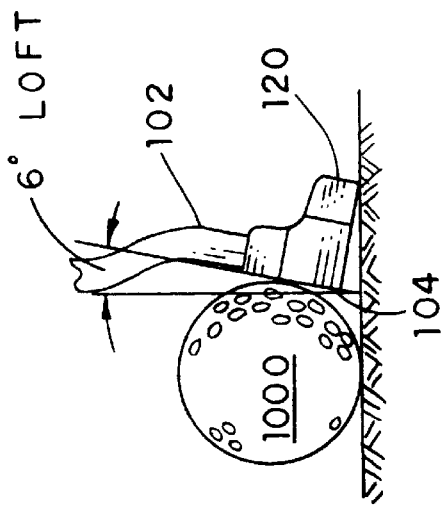
FIG. 4B is a side elevational view of a putter having too large a loft.
Figure 4A:
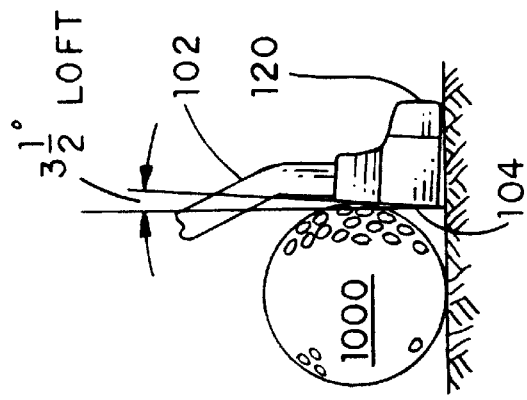
FIG. 4A is a side elevational view of a putter having the proper loft.

A better understanding of the golf club customizing system 10 of the present invention may be had by first referencing FIGS. 1A and 1B. Therein it may be seen that the golf club customizing system 10 of the present invention includes a portable rollable cart 200 in which a variety of combinations golf club heads, hosels and shafts 202 are contained in storage sleeves 201. Additionally, there is a place 204 for storing various types of grips 206. On top of the cart 200 is a vise 11 for bending the hosel portion 102 of the golf club 100 and a system 800 for holding the shaft of the golf club while it is cut to length. On the opposite end of the cart 200 is a small tool tray 208 in which the various tools needed for operation of the system 10 may be located. Also included in the system 10 is a measuring golf club 300 (FIG. 8) which is used for obtaining the starting measurements necessary to custom fit a golf club 100 to a particular golfer.

While the present invention will be described particularly in terms of its use with putters, it will be understood by those of ordinary skill in the art that it may be adapted for use with drivers and irons.

Construction of the Bending Vise

Figure 5:
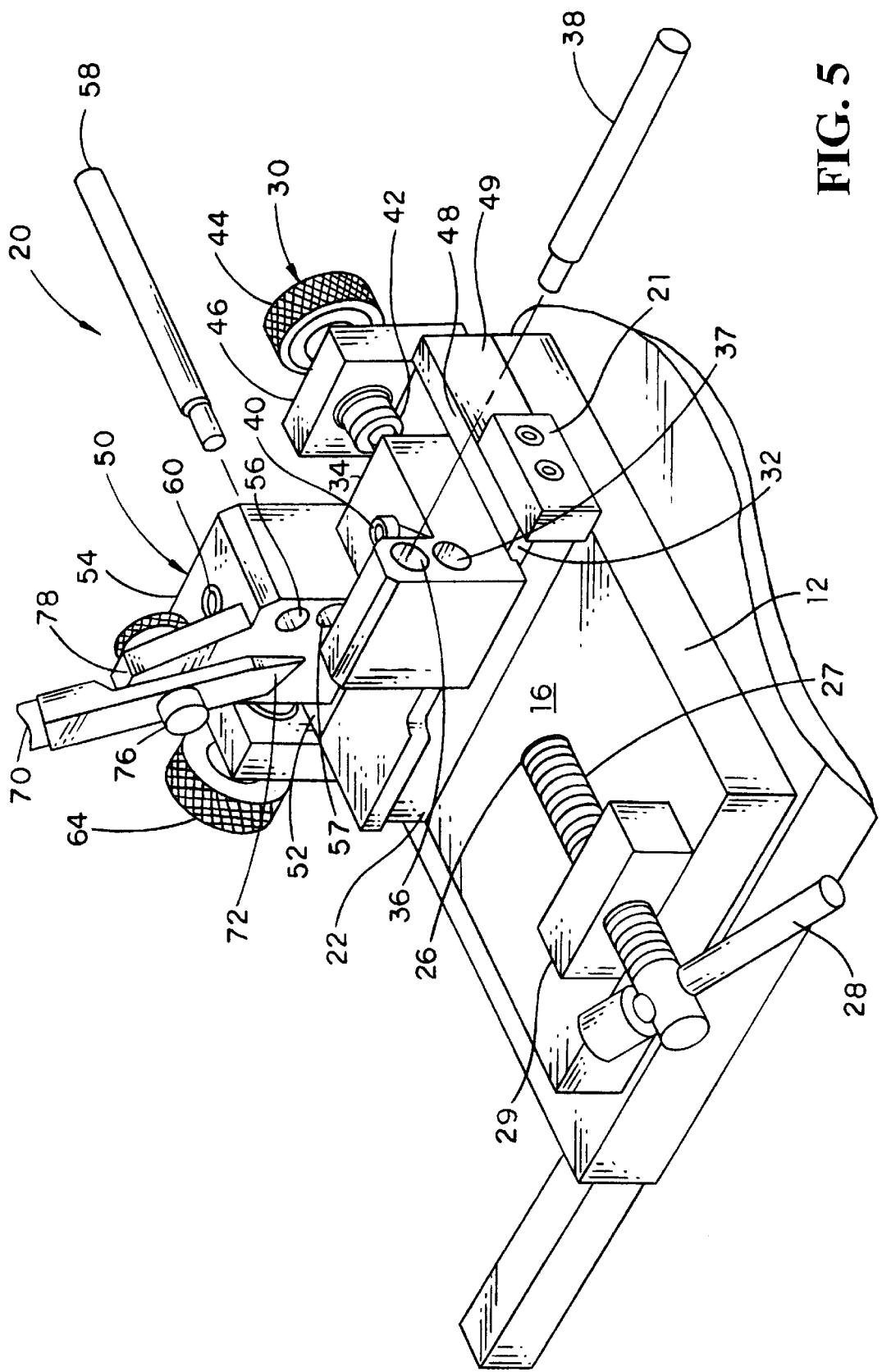
FIG. 5 is a rear perspective view of the hosel bending vise.
Figure 6:
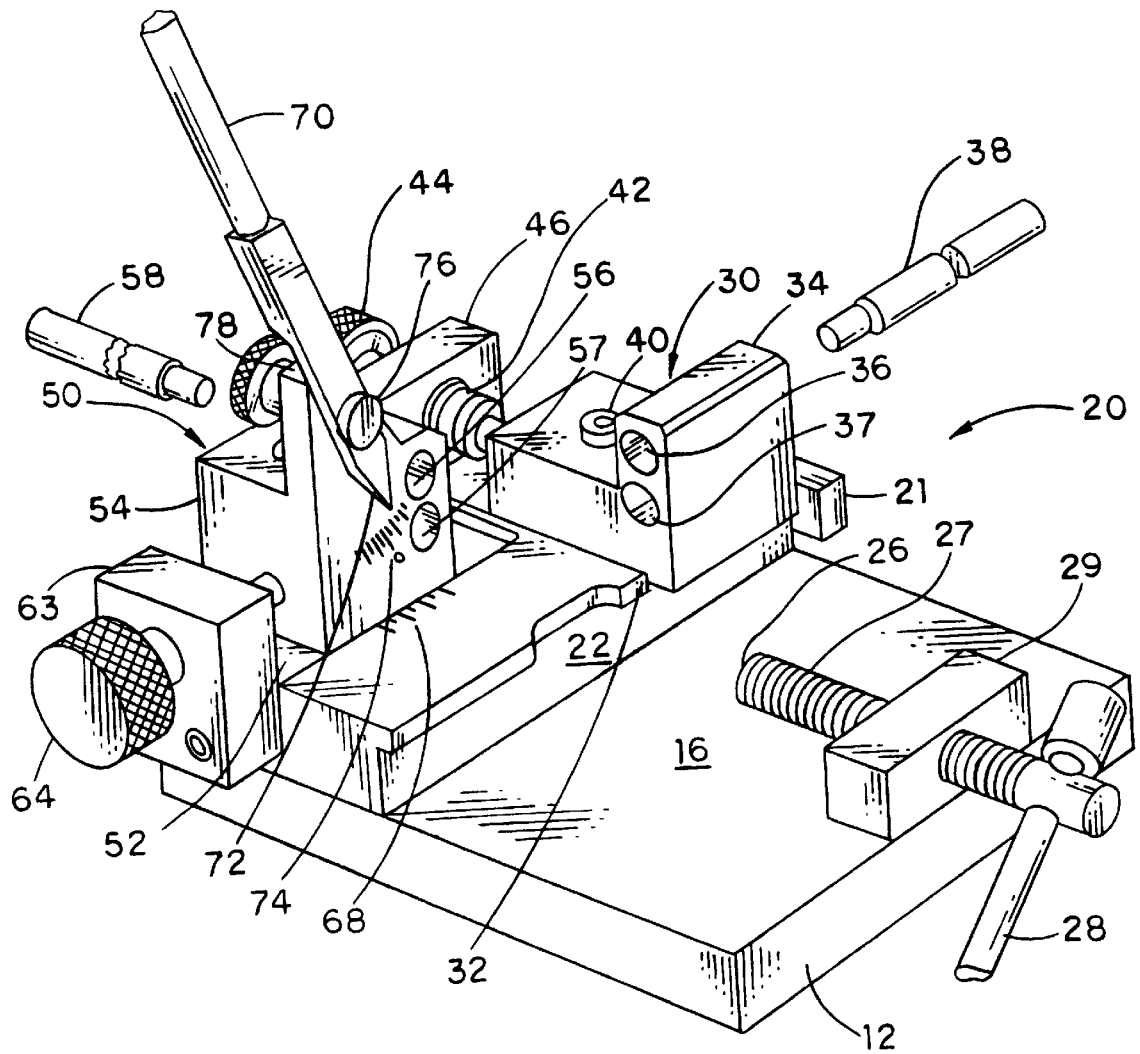
FIG. 6 is a front perspective view of the hosel bending vise.

Shown in FIGS. 5 and 6 are perspective views of the golf club hosel bending vise 11. Note that the vise 11 is built above a base plate 12. The base plate 12 provides the mounting for the two sliding block assemblies 30, 50 which impart the offset bend and the lie angle bend into the hosel 102 of the golf club 100.

Formed just above the base plate 12, in front of the bending systems 30, 50 is the mounting space portion 16 of the clamping system 20 in which the golf club head 106 is securely positioned to enable the bending of the hosel 102. To assure proper positioning of the golf club head 106 in the mounting space 16, an abutment plate 21 is provided. The toe 118 of the golf club head 106 is placed in contact with the abutment plate 21. The striking face 104 of the golf club head 106 engages an angled surface 22. In the preferred embodiment, the angle of this surface is 3½° which matches the angle of the ball-striking surface 104 of the club head 106.

Figure 7A:
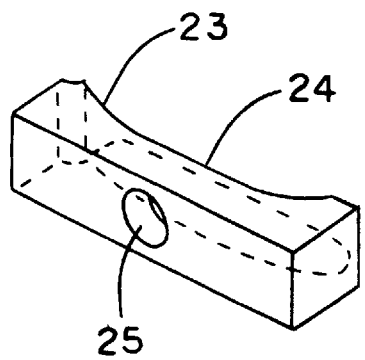
FIGS. 7A, 7B and 7C are perspective views of the chucking blocks used to hold the golf club heads in the hosel bending vise.
Figure 7B:
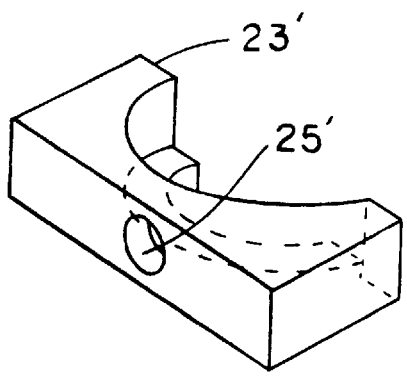
Figure 7C:
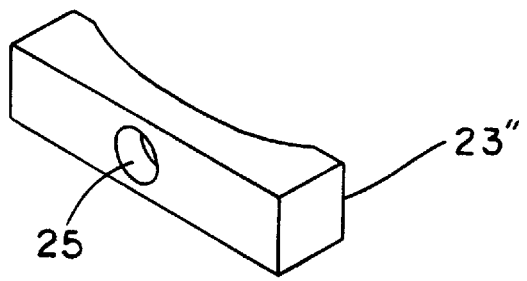

After the toe 118 of the club head engages the abutment plate 21 and the striking face 104 of the club head 106 is in contact with the angled surface 22 a chucking block 23, as shown in FIGS. 7A, 7B and 7C is placed against the rear surface 120 of the club head 106. The chucking 23, 23' and 23" includes a specially designed recess 24, 24' and 24" to accommodate corresponding types of club heads. On the back ofthe chucking block 23, 23' and 23" is a circular bore 25, 25' and 25" which is sized to engage the end 26 of a threaded rod 27.

Once a chucking block 23, 23' and 23" has been placed behind a club head 106 the end 26 of the threaded rod 27 is moved into contact with the chucking block 23, 23' and 23" by turning it through internally threaded stationary block 29. The hosel portion 102 of the club head 106 is now in a position where it can be accurately bent to custom fit a club to an individual golfer.

Recall that offset is the result of a bend in the hosel 102 which places an extension of the long axis 110 of the golf club shaft 118 a short distance in front of the plane of the striking surface 104 of the golf club head 106. The offset bend sliding block assembly 30 is slidably mounted on the base plate 12. The offset bend sliding block assembly 30 is positioned by reference to a scale 48 formed on a base block 49 which is mounted on the base plate 12. The scale 48 provides the ability to measure the golf club hosel bending vice 11 for various offsets. A recording of the offset settings for an individual golfer or any of the other measurements described herein will enable the duplication of any customized golf club when the customized golf club has been lost or damaged.

The sliding block portion 34 of the offset bend sliding block assembly 30 is moved along path 32 by turning a knob 44 which is attached to a threaded rod 42. The threaded rod 42 passes through a threaded hole in a stationary block 46 which is affixed to base block 49. The sliding block portion 34 is then locked in position by tightening a cap screw 40 which threadably engages the base block 49. Tightening of the cap screw 40 assures that the sliding block portion 34 of the offset bend sliding block assembly 30 does not move when the hosel 102 is bent. Passing through an upper pinhole 36 in the offset sliding block portion 34 is a first pin 38. It is the first pin 38 which provides the surface against which the hosel 102 of the golf club 100 is bent to place an offset in the golf club 100 between the long axis 110 of the shaft 118 and the striking face 104 of the club head 106. If a short hosel 102 is used the pin 38 is placed in a lower pinhole 37.

The lie angle bend sliding block assembly 50 moves along a path 52 perpendicular to the path 32 traveled by the offset sliding block assembly 30; however, it operates in substantially the same way.

By turning a knob 64, a threaded rod is caused to pass through an internally threaded hole in a stationary block 63. The stationary block 63 is affixed to the base block 49. The turning of knob 64 causes the lie angle bend sliding block 54 to move along path 52 over the base block 49. Positioning of the lie angle sliding block 54 is accomplished by reference to a scale 68 formed on the base block 49. A bending surface is provided by a second pin 58 which passes through a pinhole 56 in the lie angle sliding block 54. For short hosels 102 a lower pinhole 57 is also provided. A cap screw 60 is used to hold the lie angle sliding block 54 against the base block 49.

An extended angular gauge bar 70 projects upwardly from the lie angle sliding block 54. The extended angular gauge bar 70 is used to measure the proper bending of the hosel 102 to the predetermined lie angle bend. At the bottom of the angular gauge bar 70 is a pointer 72 which is positioned near an arcurate scale 74. The angular gauge bar 70 is locked in position by tightening a threaded fastener 76 which passes through a hole formed in the angular gauge bar 70 and an ear 78 which extends upwardly from the lie angle sliding block 54.

Operation

A still better understanding of the present invention may be had by reference to the method in which it is used to impart bends in the hosel 102. Use of the club customizing system 10 of the present invention begins by having a golfer select a club head design and club head material from the collection of club head, hosel, and shaft combinations 202 stored in the cart 200. For example, some golfers prefer a blade style club head. A blade style club head has a very sold feel, a simple traditional look and a toe balance. A golfer who relies on the feel of the club and who does not require a lot of visual assistance aligning the club head with the golf ball will usually choose a blade style club head.

A second type of club head is what has become known as a perimeter or heel-toe weighted golf club head. A perimeter or heel-toe weighted golf club head typically includes weights on the heel and the toe portions of the club head, a unique design and a very solid feel. Perimeter or heel-toe weighted club heads are thought to be more stable for improperly hit golf balls. Golfers who have trouble hitting the sweet spot on the golf club head often chose a perimeter weighted golf club head.

A third type of golf club head is what is known as a mallet head. The mallet head offers a very unique feel, a large visible alignment aid and a larger mass. The larger mass assists some golfers in keeping the golf club head on a straight path as they move the golf club head into contact with the golf ball.

Concerning materials, golf club heads are made from a variety of different metals. For example, some golfers prefer copper or a copper alloy. Copper is generally the softest metal used for golf club heads.

Other golfers prefer a soft carbon steel or an alloy thereof. The soft carbon steel is generally preferred by golfers for its consistent quality, its ease of sizing and its attractive appearance.

Still other golfers prefer a brass club head. It is a bit harder than copper and has bright, shiny appearance.

Still others prefer aluminum or an aluminum alloy because of its light weight and its soft feel.

While the foregoing materials are common materials used to form a golf club head, it will be understood by those of ordinary skill in the art that as materials technology improves still other materials such as magnesium and titanium or their alloys could be used for forming a golf club head. Alternatively, golf club heads may be formed of non-metallic metals.

Yet another parameter used in club selection is hosel length. Some golfers prefer a short hosel while others prefer a long hosel.

Once the golfer has selected the style of club head, the material from which the club head is to be made, and the hosel length from the collection of combinations 202, the next step is to measure the size and configuration of the golf club most suitable for the golfer. Herein an adjustable or measuring type golf club 300 (FIG. 8) is used. A golf professional will typically observe the stance and the posture of the golfer and make corrections where necessary. When the proper stance and posture are achieved, it is then possible to determine the ideal shaft length for a particular golfer and the ideal lie angle between the golf club head 306 and the golf club shaft 318. By using a measuring golf club 300 with an adjustable telescoping section 390 and an adjustable lie angle section 395, it is possible for the golf professional to determine exactly what geometry of a golf club suits an individual golfer best.

The best lie angle and best shaft length are established using the measuring golf club 300. Lie angle and shaft length are interdependent. By using the measuring golf club 300, it is easy to determine the most comfortable length of the golf club shaft 318. For example, some golfers want to have their arms fully extended and eyes over the ball. Others may want their arms bent and their eyes slightly in front of the ball. Still other golfers may need special arrangements to protect a bad back or a bad shoulder or correct for poor posture. Once the length of the golf club shaft 318 has been determined, the golf club head 304 is moved so that it is flat on the floor. This sets the lie angle between the shaft 318 and the club head 304.

As putters typically have a loft of about 2° to 4° to cause the golf ball to roll properly across the green, some golfers may either add loft or remove loft by the positioning of their hands. However, if the golfer compensates for the loft on the striking face of the golf club, it will be necessary to return to loft to about 2° to 4°. This may be accomplished by either bending the hosel in the direction of golf ball travel or away from the direction of golf ball travel.

While sizing the golf club, the golf professional observing the golfer should also be aware of whether or not the golfer's stance has a forward press or a rear press. The forward press often occurs when most of the golfer's weight is on the front foot. A rear press often occurs when most of the golfer's weight is on the rear foot. If the golfer has a forward press or a rear press, it may be necessary to adjust the angle of the striking face 306 of the club head 304 to return it to the ideal angle of about 2° to 4°.

Figures 8, 9:
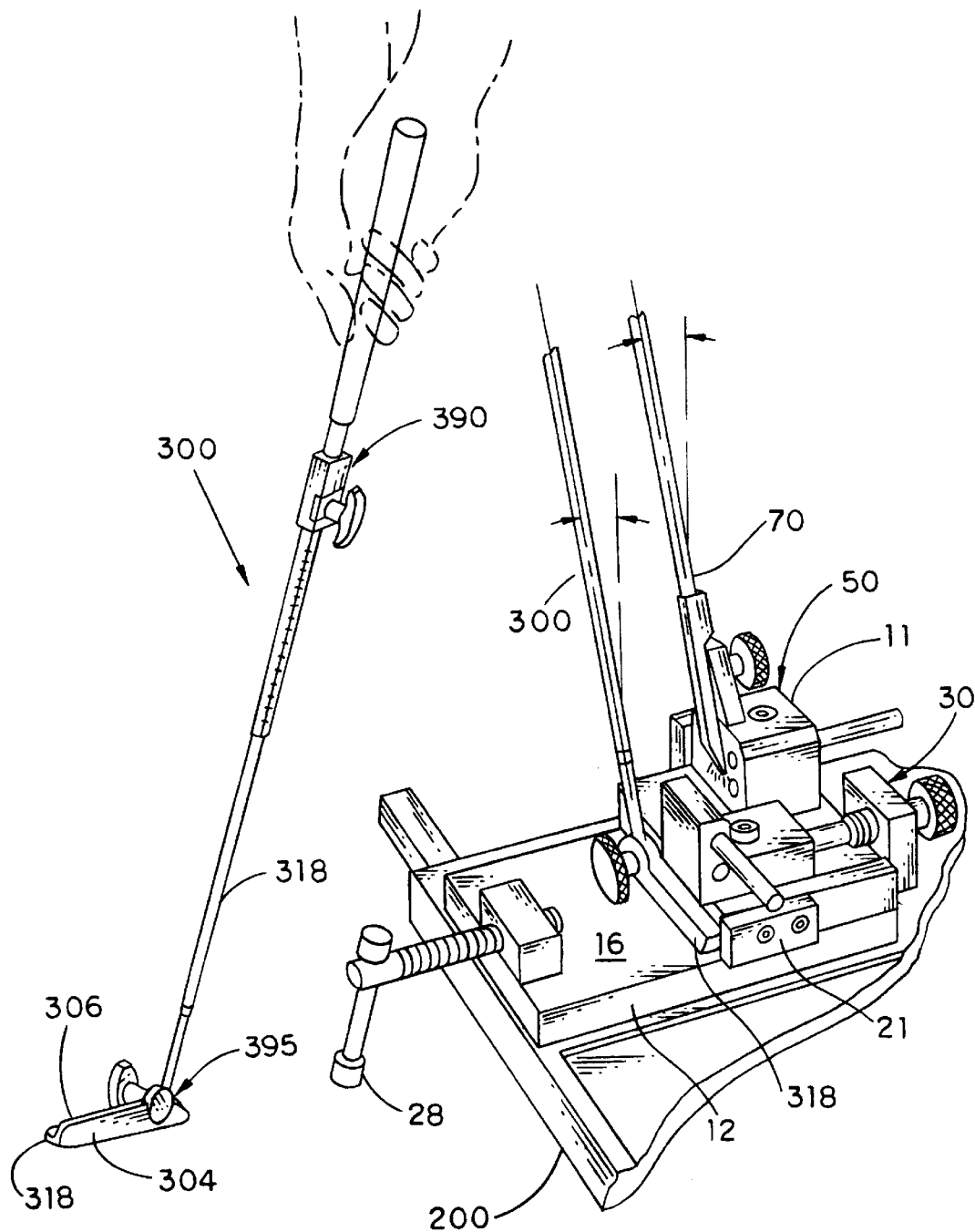
FIG. 8 is a front perspective view of the measuring club used for determining the lie angle and the shaft length for an individual golfer.
FIG. 9 is a rear perspective view of the hosel bending vise with the measuring club positioned therein.

The exact size of the lie angle is determined by placing the measuring golf club 300 in the bending vice 11 as shown in FIG. 9. By placing the toe 319 of the club head 304 against the abutment plate 21 the angular gauge bar 70 can be moved so it is parallel with the shaft 318 of the measuring club 300. The position of the pointer 72 at the end of the angular gauge bar 70 against the arcurate scale 74 provides the size of the lie angle. The difference of the measured lie angle from the standard 72° is used to enter the chart 700 shown in FIG. 10 whose use will be explained below.

Next, the offset distance is determined. The offset distance is a personal choice for most golfers. Some golfers like to see a lot of the golf ball. Others may want to feel that their hands are well ahead of the golf ball. As previously indicated, a clear benefit of the offset distance is its direct correlation to the size of the sweet spot on the striking face 104 of the golf club head 106. As the size of the offset increases, so does the size of the sweet spot. This can be best explained by using an example of a faced balance golf club with a 0° offset and bouncing a golf ball on the sweet spot which, on a face balanced golf club, is located directly under the point where the shaft 118 enters the golf club head 106. If one continues to bounce the ball on the club face 104 moving slightly away from the sweet spot, one can immediately feel the putter head 106 turn and the shaft 118 twist. Now, if one bounces a golf ball on the striking face 104 of a golf club head 106 with a greater offset, it may be seen that the size of the sweet spot grows. That is, more distance is required from the sweet spot to cause the club head 106 to turn and the shaft 118 to twist. A golfer who has trouble hitting the golf ball on the sweet spot may improve his or her game by increasing the offset distance between the axis 110 of the golf club shaft 118 and the striking face 104 of the golf club head 106.

Next the proper balance of the golf club head is determined. Specifically, some golfers may want the head 106 of their golf club 100 face balanced, toe balanced or heel balanced. Most golfers prefer a face balanced club head. With a face balanced club head, there is equal distribution of weight on either side of the sweet spot. Because of the complex inter-relationship of club head balance and lie angle, the face balance chart 700 shown in FIG. 10 is used. To determine a setting for the lie angle sliding block 54 against scale 63, the lie angle determined from the reading on the arcuate scale 74, as previously explained, and the type of club head and hosel combination are used to enter the face balance chart 700 shown in FIG. 10. The number extracted from the face balance chart 700 is set on the bending vise 11 by moving the lie angle sliding block 54.

The shaft length for the putter to be customized is determined by matching up the shaft length of measuring golf club 300 with the golf club being customized. The shaft of the golf club being customized is marked so that it may be cut to the proper length using the length sizing equipment 800 on top of the cart 200.

The following detailed operational steps will provide a still better understanding of how a golf club may be customized using the portable, easy to use system of the present invention.

First, the cap screw 40 is loosened. By turning the adjustment knob 44, the offset bend sliding block 34 is moved to impart the necessary bend in the hosel 102 to obtain the desired offset distance. The standard offset distance is indicated on scale 48 as 0. A preferred offset distance is the top edge of the club head 106 aligning with the long axis 110 of the shaft 118. Each mark on the scale 48 represents a 1/16th inch offset distance. A total offset distance of ½ inch can be obtained. Once the desired setting of the sliding block 34 is made with respect to the scale 48, the cap screw 40 is tightened.

The next step involves assuring that the lie angle gauge bar 70 is at the desired angle. A standard lie angle is 72°. This standard lie angle is indicated on the arcuate guide scale 74 as 0. All other lie angle settings are represented as being degrees away from the standard 72° angle.

The third step is to loosen the cap screw 60 which holds the lie angle sliding block 54 in place. Using the face balance chart 700, it is then possible to determine the setting required to obtain the type of face balance preferred by a particular golfer. By using the chart 700 shown in FIG. 10, a gauge 68 setting is found for a face balanced club head. If the golfer desires a toe heavy club head, the chart value is decreased. If the golfer desires a heel heavy club head, the chart value is increased. By turning the adjustment knob 64, the lie angle sliding block 54 is moved to the desired setting against gauge 68 and then tightened in position by turning the cap screw 60.

In the fourth step, it may be seen that there are two pin holes for each of the two bending pins 38, 58. The top pin holes 36, 56 are for long hosels. The bottom pinholes 37, 57 are for short hosels.

The fifth step is to insert the golf club head 106 into the bending vise 11. It is important that the ball-striking face 104 of the club head 106 fits flush against the angle plate 22. The toe of the club head 106 should contact the abutment plate 21.

Figure 11:
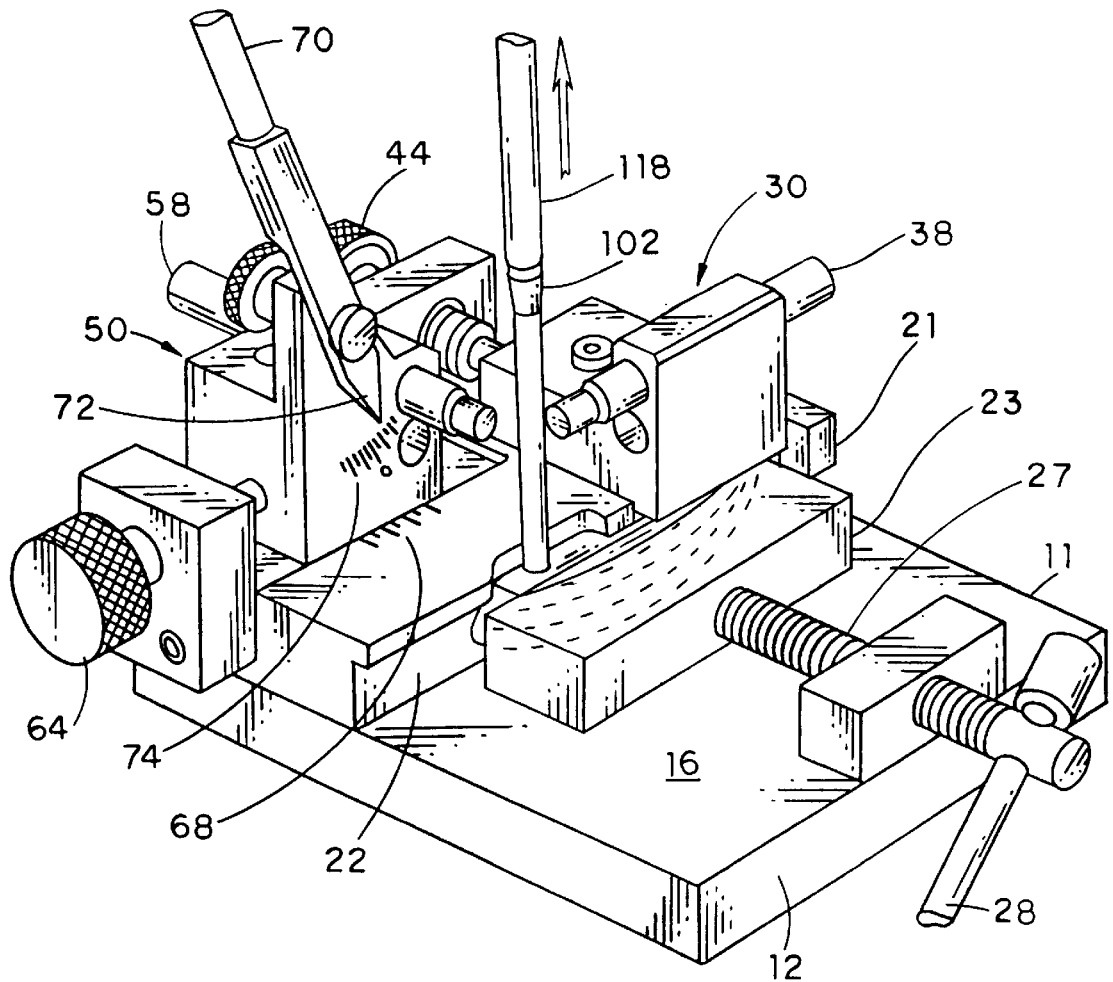
FIG. 11 is a front perspective view of the hosel bending vise showing the initial location of the club head of the golf club to be customized.

The sixth step is to select the appropriate chucking block 23, 23', 23" to place against the rear surface 120 of the golf club head 106. As shown in FIGS. 7A, 7B and 7C the shape of the chucking block 23, 23' and 23" is dependent on the style of the club head 106. By rotating the handle 28 the end 26 of the threaded rod 27 is moved into the bore 25, 25', 25" on the back of the chucking block 23, 23', 23". The club to be customized is now in position for the bends to be made in the hosel 102. Proper placement of the club head 106 in the vise 11 is shown in FIG. 11.

Figure 12A:
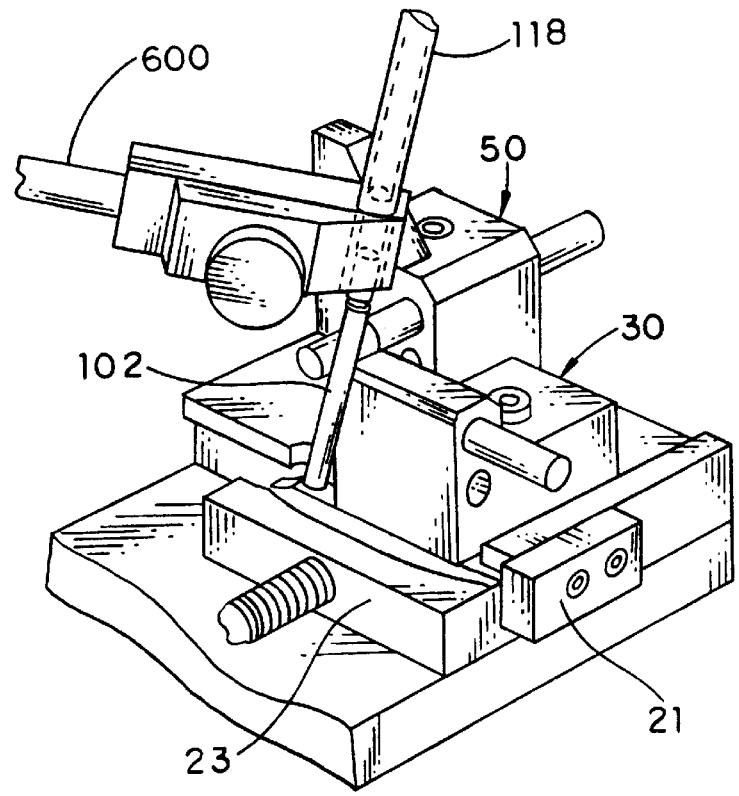
FIG. 12A is a perspective view of the hosel bending vise showing the making of the clearance bend.

As shown in FIG. 12A, the seventh step involves attaching a bending tool 600 to the bottom of the shaft 118 and securing the bending tool 600 to the shaft 118. As shown in FIG. 13, the end of the bending tool 600 includes a first recessed plate 602 and a keeper plate 604. A threaded rod 606 turned by a knob 608 into an internally threaded hole 610 in the first plate 602. This secures the shaft 118 of the golf club 100 in the recess 612 in the first plate 602. The handle 614 which extends from the first plate 602 is used to impart a bending force on the shaft 118.

The recess 612 generally will fit loosely over the shaft 118. To avoid possible damage to the shaft 118, the bending tool 600 must be secured at the bottom of the shaft 118 as each bend is made. To understand why the location of the bending tool 600 on the shaft 118 is important, reference is made to FIGS. 14A and 14B. In FIG. 14A a short hosel 102' is shown extending upwardly from a golf club head 106. The upper portion 103' of the hosel 102 extends into and is tightly fit into the interior of the shaft 118. In FIG. 14B a long hosel 102 is shown. To minimize the weight of the hosel 102, its upper portion 103 is shorter. An extension 105, formed of a lightweight metal, mates with the upper portion 103. When the bending tool 600 is in place on the club shaft 118 it is important that the bending tool 600 surround the upper portion of the hosel 103, 103'. Otherwise, when force is placed on the handle 614, the shaft 118 will crimp and the golf club shaft 118 will be ruined.

Figure 12B:
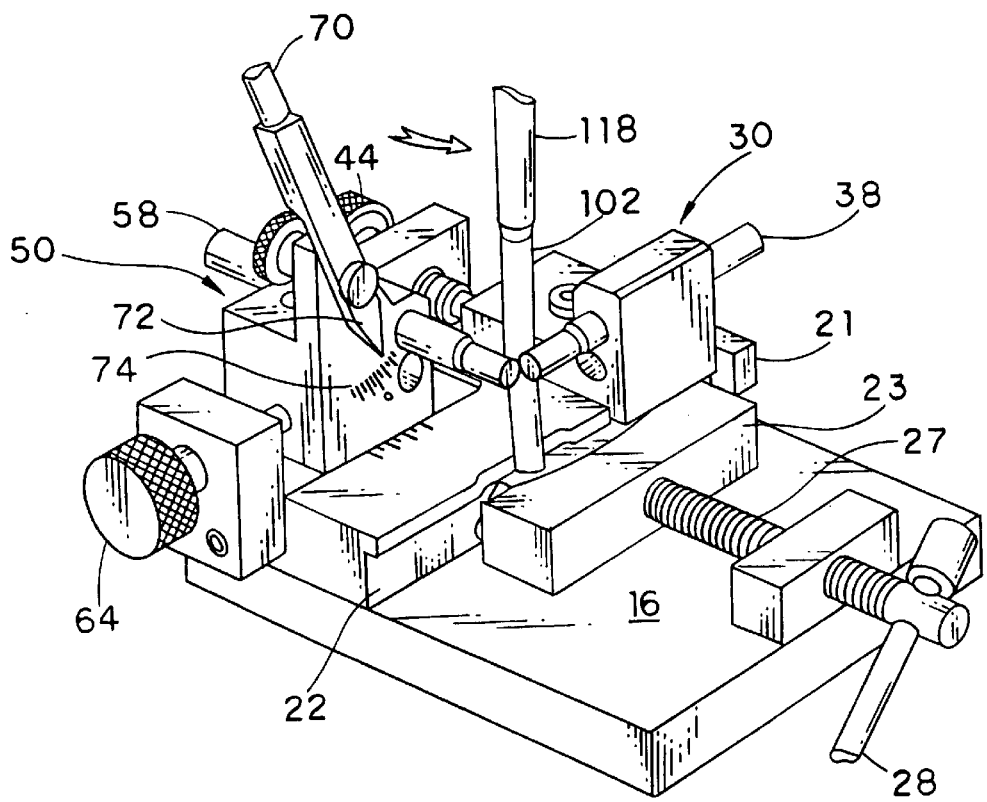
FIG. 12B is a front perspective of the hosel bending vise showing the position of the bending pins after the completion of the clearance bend.

Referring back to FIG. 12A, a clearance bend is now made in the hosel by exerting force on the handle 614 which extends from the bending tool 600. This clearance bend is necessary so that the bending pins 38, 58 may be pushed through the pinholes 37, 57 until their ends touch. This is shown in FIG. 12B.

Figure 15:
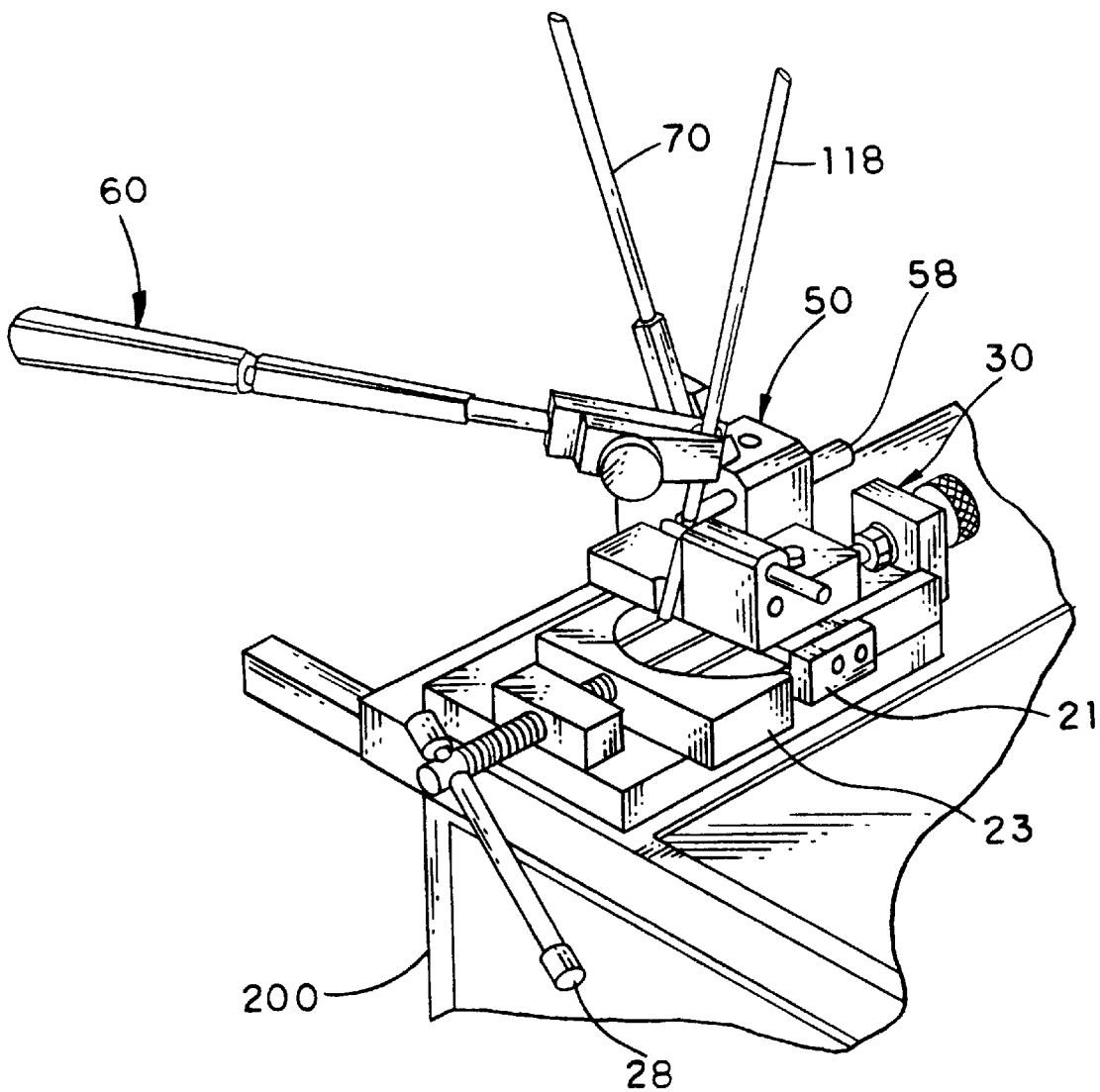
FIG. 15 is a front perspective view of the hosel bending vise just prior to the initiation of the bend which establishes the offset distance.

The ninth step involves imparting the offset bend into the hosel 102. This is accomplished by bending the hosel 102 with the bending tool 600 until the shaft 118 is in a substantially vertical plane which is parallel to the vertical plane of the angular gauge bar 70. The beginning of the offset bend is shown in FIG. 15. A completed offset bend is shown in FIG. 12B.

Figure 16:
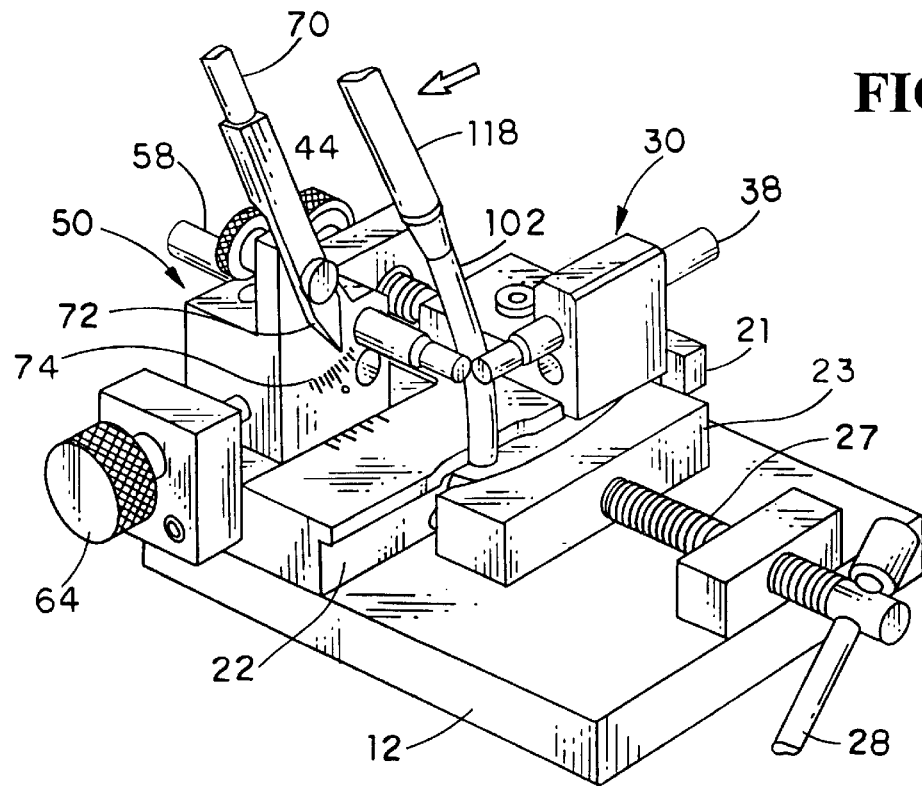
FIG. 16 is a front perspective view of the hosel bending vise after completion of the lie angle bend.

The tenth step is to impart the lie angle bend into the hosel 102. This is done by rotating the bending tool 600 on the bottom of the shaft 118 so that the hosel 102 may be bent to an angle so that the angle ofthe shaft 118 matches the angle of the angular gauge bar 70. This is shown in FIG. 16.

Figure 17:
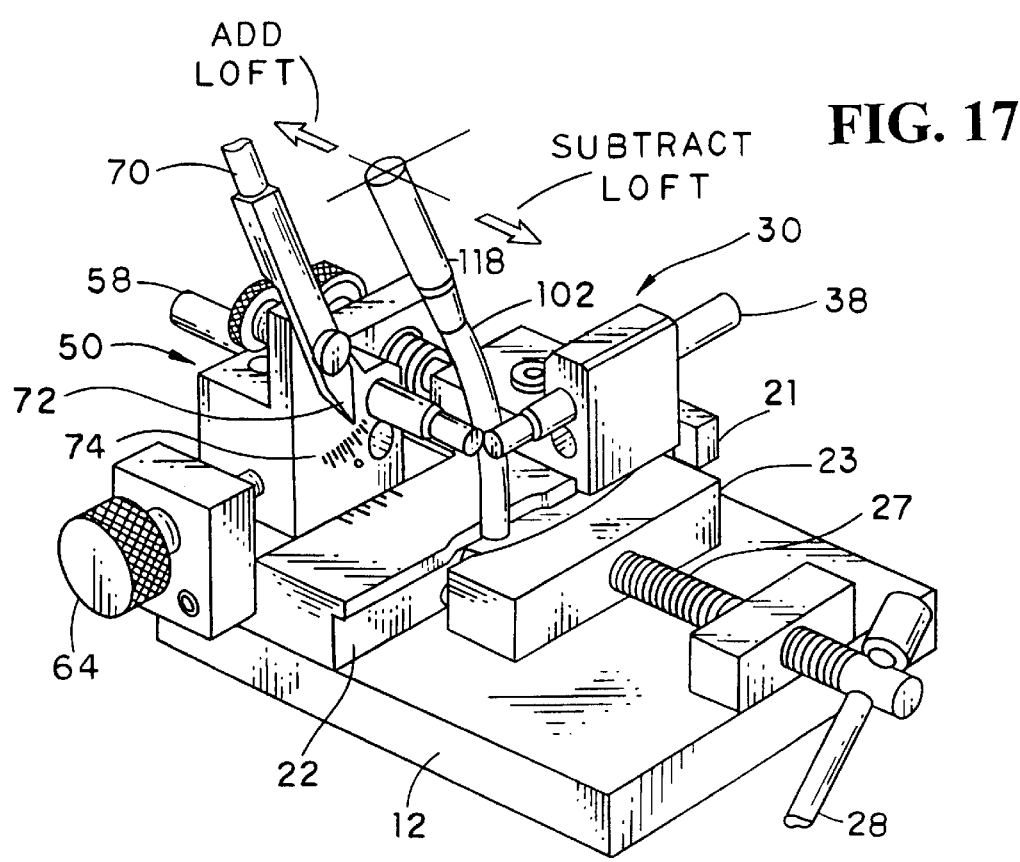
FIG. 17 is a front perspective view of the hosel bending vise showing the adjustment of loft.

If a loft adjustment is needed the hosel 102 is bent as shown in FIG. 17. Specifically, the shaft 118 is bent slightly forward or slightly backward to change the loft on the ball striking face 104 of the club head 106.

The customized golf club is now removed from the vise 11 and provided to the golfer. Adjustments may be made by reinserting the club head 106 into the hosel bending vice 11.

Figures 18, 19:
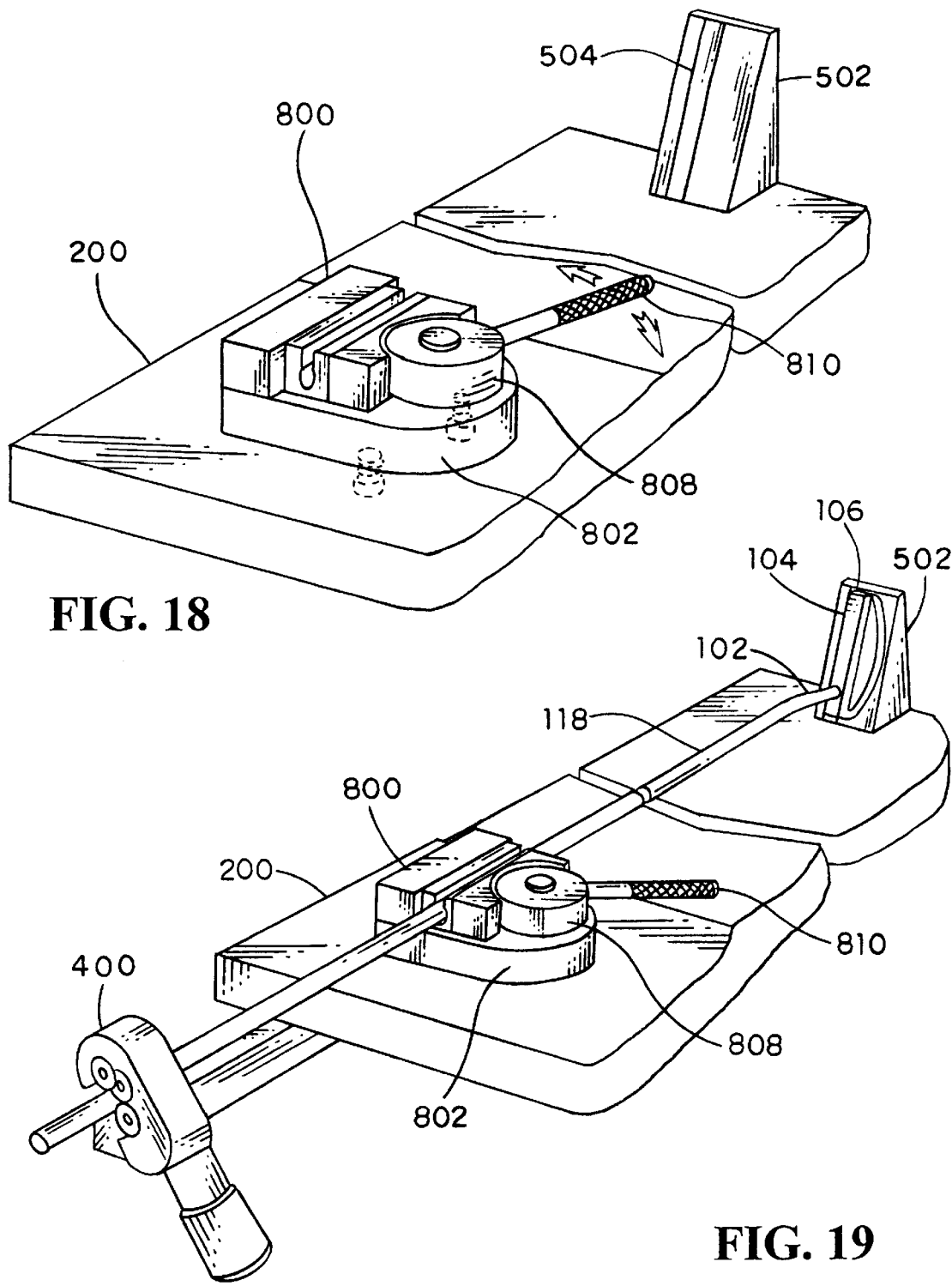
FIG. 18 is a perspective view of the system used for holding the shaft of the golf club, for sizing the length of the shaft, and placing the grip on the end of the shaft.
FIG. 19 is a perspective view similar to FIG. 18 with the golf club inserted in the shaft engagement vise.

In the final steps, the shaft of the golf club is cut to the desired length. As shown in FIGS. 18 and 19 the club head 106 is placed against a stop 502 on the top surface of the cart 200. The face 104 of the club head is aligned by comparison with vertical lines 504 marked on the stop 502. The shaft engagement vise 800 is used to secure the shaft 118 in position to be cut to length.

Figure 20:
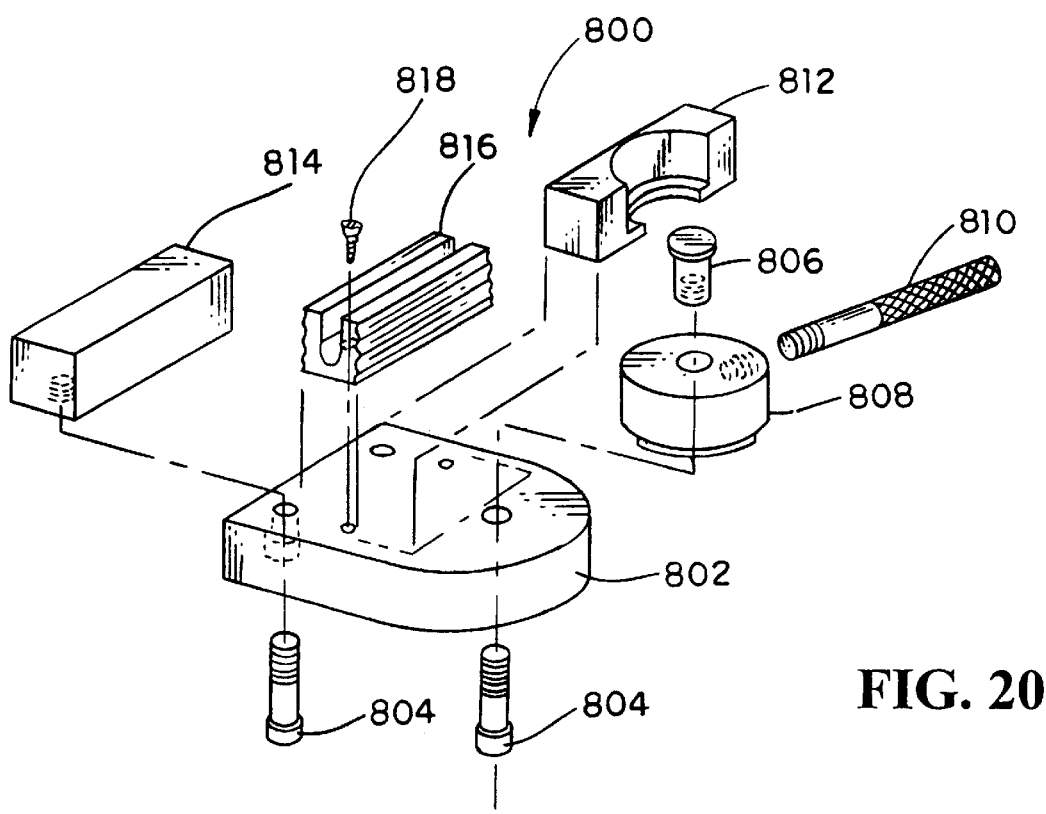
FIG. 20 is an exploded view of the shaft engagement vise.

The construction of the shaft engagement vise 800 is shown in FIG. 20. A base plate 802 is secured to the top of the cart 200 by threaded fasteners 804. A pin 806 holds an eccentric cam 808 against the base plate 802. When the handle 810 causes the eccentric cam 808 to rotate a first movable block 812 is moved toward a second stationary block 814. This compresses a flexible cradle 816 which may be made from rubber or plastic. The flexible cradle 816 is attached to the base plate 802 by threaded fasteners 818.

Figure 21:
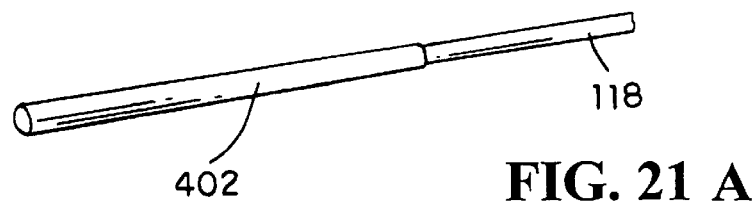
FIG. 21A is a perspective view of the golf club shaft showing the application of the double sided tape.
FIG. 21B is a perspective view of the golf club shaft showing the installation of the hand grip.
Figure 21:
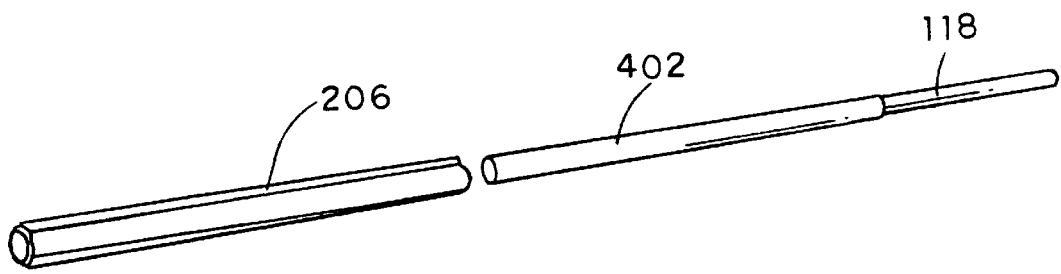

While the shaft 118 is secured in the shaft engagement vise 800 the shaft 118 is cut to length using a commonly available tubing cutting tool 400 as shown in FIG. 19. Next the grip 206 selected by the golfer from the selection of grips in the tray 204 and attached to the end of the shaft 108. This is accomplished by applying double sided tape 402 to the end of the shaft 118 as shown in FIG. 20. As shown in FIG. 21B the grip 206 is then slid over the double sided tape 402 by using an evaporative solvent. When the solvent has evaporated, the grip 206 will be securely attached to the golf club shaft 118.

It will be understood by those of ordinary skill in the art that while threaded shafts are used to move the sliding blocks in the vise 11 and lock them in position, other methods such as cam locks may be used without departing from the scope of the present invention. Alternatively, the sliding blocks may be moved by small motors and accurately positioned by transducer measurement.

While manual bending of the hosel is shown, it is also possible to utilize a motorized hosel bending system.

While manual scales are shown on the hosel bending vise, it is also possible to utilize digital electronic or laser measurement to obtain highly accurate measurements of club geometry.

Accordingly, the present invention provides a portable, easy to use system by which a custom golf club may be both made and "fine tuned" for an individual golfer without having to rely on the capabilities of a special factory. Thus, all waiting time for custom golf clubs has been eliminated.

While the present invention has been described according to its preferred and alternate embodiments, those of ordinary skill in the art will realize that other constructions of the present invention have now been enabled. Such other constructions shall fall within the scope of the appended claims.

What is claimed is:

1. A system for customizing a golf club, said golf club having: (a) a head of a predetermined type including a ball striking face, a toe and a heel, and a rear surface, (b) a shaft, (c) a hosel of a predetermined length between said shaft and said head and (d) a balance orientation of the ball striking face of the head with respect to the shaft, said customizing system comprising:

means for positioning and holding the head of the golf club;

means for imparting an offset bend in the hosel; and means for imparting a lie angle bend in the hosel.

2. The system for customizing a golf club as defined in claim 1 further including means for determining the balance orientation of the ball-striking face of the golf club head with respect to the golf club shaft.

3. The system for customizing a golf club as defined in claim 2 wherein said means for determining the balance orientation of the ball striking face of the golf club head with respect to the golf club shaft is dependent on the type of golf club head and the length of the hosel.

4. The system for customizing a golf club as defined in claim 1 wherein said means for positioning and holding the head of the golf club further includes:

a chucking block constructed and arranged to engage the rear surface of the golf club head;

an angled surface plate constructed and arranged to engage the ball striking surface of the golf club head; and an abutment plate constructed and arranged to engage the toe of the golf club head.

5. The system for customizing a golf club as defined in claim 1 wherein said means for imparting an offset bend in the hosel includes:

a sliding block assembly;

said sliding block assembly constructed and arranged to position a bending surface against the hosel.

6. The system for customizing a golf club as defined in claim 5 wherein said bending surface is a pin.

7. The system for customizing a golf club as defined in claim 1 wherein said means for imparting a lie angle bend in the hosel further includes:

a sliding block;

said sliding block constructed and arranged to position a bending surface against the hosel; and a angular gauge bar for determining when a predetermined lie angle bend has been imparted in the hosel.

8. The system for customizing a golf club as defined in claim 7 wherein the bending surface is a pin.

9. A method of customizing a golf club to an individual golfer, said golf club including a club head having a ball striking face oriented at a predetermined angle with respect to a vertical line, a shaft and a hosel connecting said shaft and said club head, said method comprising the steps of:

positioning and securing the golf club head in a stationary fixture;

placing a first bending surface against the hosel;

imparting an offset bend in the hosel;

placing a second bending surface against the hosel;

imparting a lie angle bend in the hosel.

10. The method as defined in claim 9 further including adjusting the angle of the ball striking face of the club head with respect to a vertical line by imparting a bend in the hosel.

11. The method as defined in claim 9 wherein said first and second surfaces are located substantially orthogonally from each other.

12. A system for customizing a golf club, said golf club including a head portion with a striking face, a shaft and a hosel interconnecting the shaft and the golf club head, said system comprising:

means for positioning and holding said golf club head in a stationary fixture;

means for imparting an off-set bend in the hosel;

means for imparting a lie angle bend in the hosel;

means for sizing the length of the golf club shaft.

13. The system for customizing a golf club as defined in claim 12 wherein said means for sizing the length of the golf club shaft further includes:

a stop;

a shaft gripping vise;

a cutting tool.

14. The system for customizing a golf club as defined in claim 13 wherein said stop further includes alignment marks.

15. The system for customizing a golf club as defined in claim 14 wherein said shaft gripping vise includes:

a rotatable cam;

a shaft engagement surface;

wherein said cam is rotated until said shaft engagement surface contacts the golf club shaft.

16. The system for customizing a golf club as defined in claim 15 further including means for mounting a grip on said sized shaft.

17. A method of customizing a golf club, said golf club including a head, a shaft, and a hosel interposed between said head and said shaft, said method comprising the steps of:

positioning and securing a golf club head in a stationary fixture;

placing a first bending surface against the hosel;

imparting an offset bend in the hosel;

placing a second bending surface against the hosel;

imparting a lie angle bend in the hosel;

sizing the club shaft to a predetermined length.

18. The method of customizing a golf club as defined in claim 17 further including mounting a grip on the end of the sized shaft.

19. A system for constructing a custom golf club for a golfer from an uncustomized golf club including a combination of a head, a hosel, and a shaft, said system comprising:

cart means for storing the uncustomized golf clubs;

means for bending the hosel portion of the particular uncustomized golf club stored on said cart means;

said means for bending the hosel further including:

means for positioning and holding the golf club head;

means for imparting an offset bend in the hosel; and means for imparting a lie angle bend in the hosel.

20. The system as defined in claim 19 further including:

means for sizing the length of the shaft mounted on said cart means;

said means for sizing the length of the shaft including a stop, a shaft gripping vise and a cutting tool.

21. A method for manufacturing a custom golf club for an individual golfer, said custom golf club including a head having a ball striking surface oriented at a predetermined loft angle, a shaft having a long axis, a hosel interposed between said shaft and said head, a predetermined club length, and a predetermined angular relationship between said shaft and said head, said method for manufacturing a custom golf club comprising the steps of:

selecting a club head style for the individual golfer;

selecting a club head material for the individual golfer;

measuring the club length for the individual golfer;

measuring the angular relationship between the shaft and the head for the individual golfer;

determining the distance of the ball striking face of the club head from the long axis of the club shaft for the individual golfer;

determining the size of a two part bend to be imparted to the hosel based on said measured angular relationship between the shaft and the head and the club head style to impart a balance between the club head and the club shaft;

adjusting a stationary fixture to accommodate said club head style, and to impart said two part bend in the hosel, which to part bend determines the angular relationship between the shaft and the head and the distance between the ball striking surface of the club head and the long axis of the club shaft;

positioning and securing the golf club head in said stationary fixture;

placing a first bending surface against the hosel;

imparting the first part of said two part bend in the hosel;

placing a second bending surface against the hose;

imparting the second part of said two part bend in the hosel;

sizing the club shaft to length;

mounting a grip on the end of the club shaft opposite the hosel.

22. The method as defined in claim 21 further including adjusting the angle of the ball striking face with respect to a vertical line by imparting a bend in the hosel.

23. The method as defined in claim 21 wherein the step of positioning and securing the golf club head in said stationary fixture further includes the step of placing a chucking block behind the golf club head.

24. The method as defined in claim 23 wherein said chucking block includes a surface shaped to engage the rear surface of the club head.

* * * * *